Figure 1:
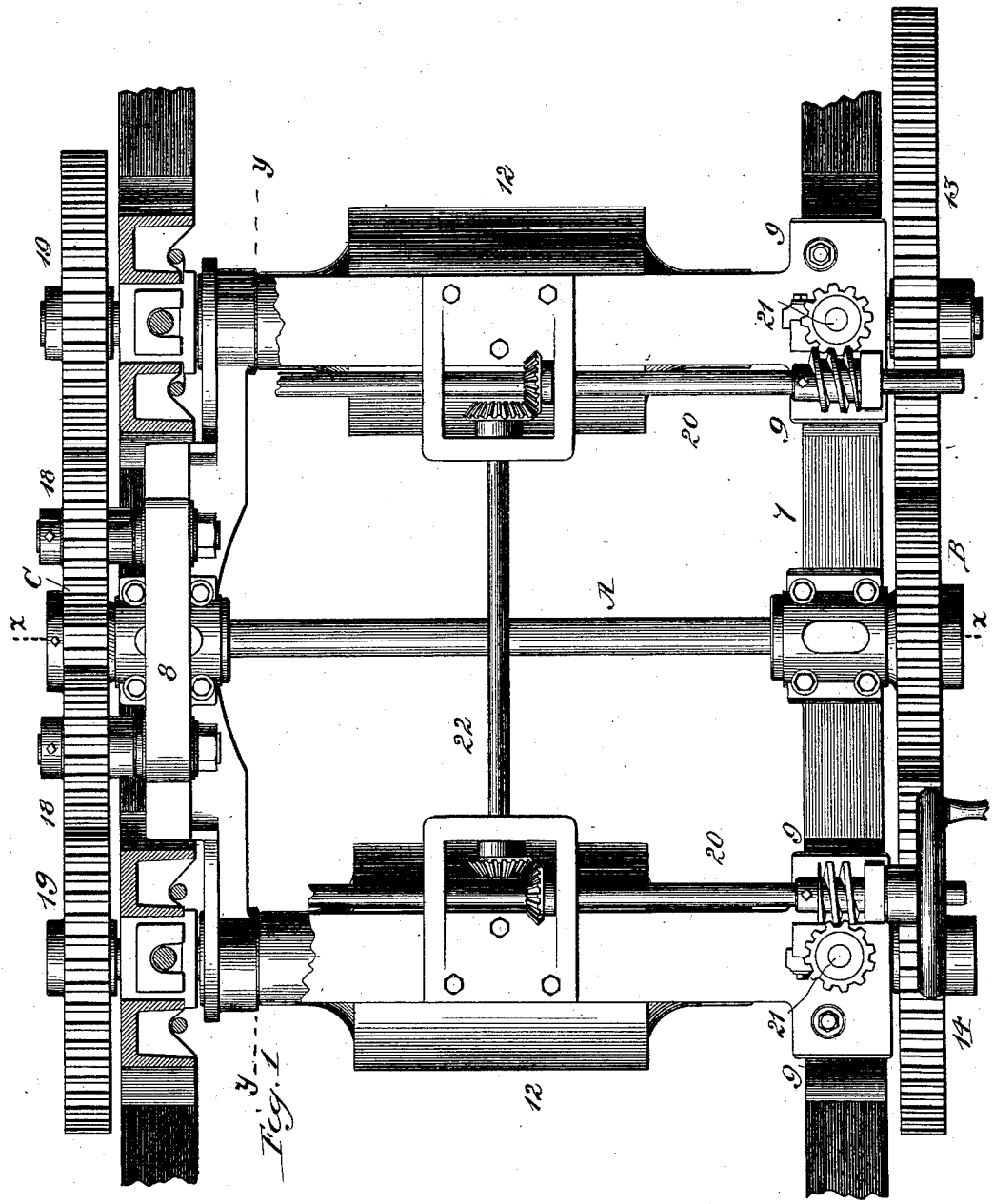

(No Model.)　　　　　　L. P. HOYT.　　　　3 Sheets—Sheet 1.
ADJUSTABLE GEARING.

No. 358,930.　　　　　　　　　Patented Mar. 8, 1887.

Witnesses.
W. Rossiter.
L. S. Logan

Inventor.
Lucius P. Hoyt
By, Chas. G. Page
Atty.

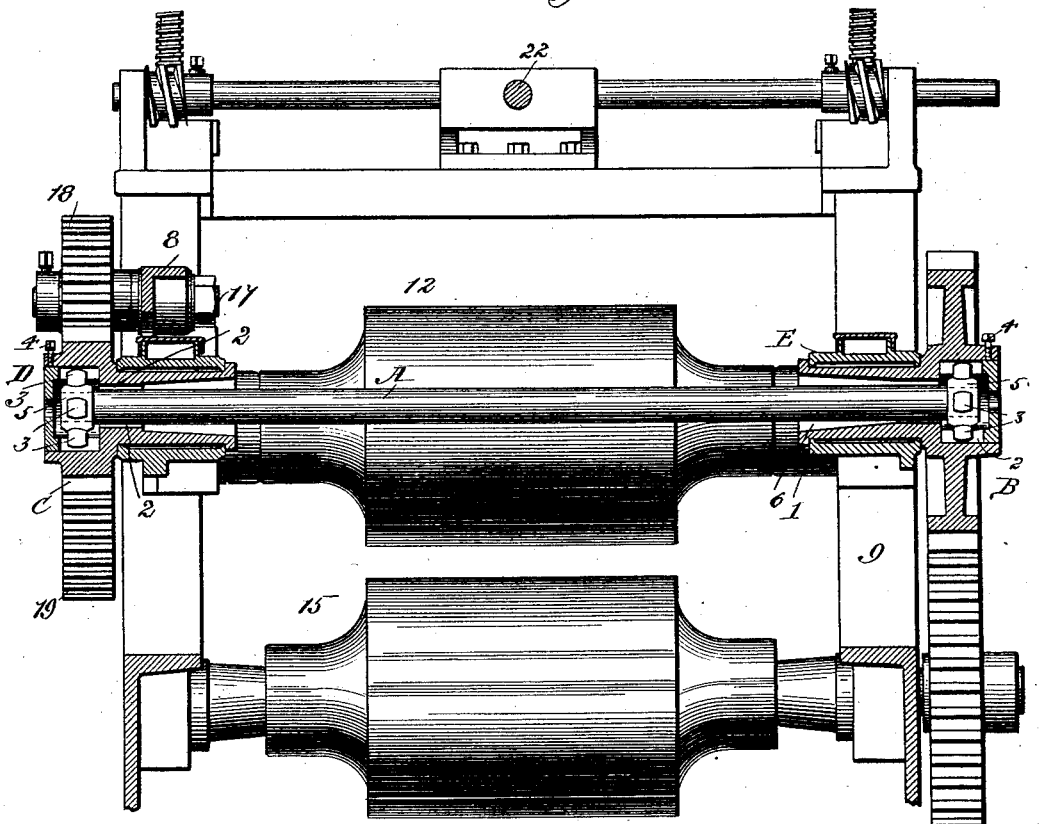

(No Model.) 3 Sheets—Sheet 3.
L. P. HOYT.
ADJUSTABLE GEARING.

No. 358,930. Patented Mar. 8, 1887.

Witnesses,
W. Rossiter.
L. S. Logan.

Inventor,
Lucius P. Hoyt
By Chas. G. Page
Atty.

UNITED STATES PATENT OFFICE.

LUCIUS P. HOYT, OF AURORA, ILLINOIS.

ADJUSTABLE GEARING.

SPECIFICATION forming part of Letters Patent No. 358,930, dated March 8, 1887.

Application filed May 7, 1886. Serial No. 201,454. (No model.)

*To all whom it may concern:*

Be it known that I, LUCIUS P. HOYT, a citizen of the United States, residing at Aurora, county of Kane, and State of Illinois, have invented certain new and useful Improvements in Adjustable Gearing, of which the following is a specification.

This invention relates to improvements in adjustable gearing adapted to perform the functions of and designed as an improved substitute for that kind of gearing commonly known as "expansion-gearing."

Said invention is particularly applicable to the adjustable feed-rolls of wood working or planing machines; but it may also be used in any other analogous connections where its presence is found desirable and serviceable.

A prominent object is to avoid the slip that is commonly incident to the swinging or rolling round of one of two gears that are in mesh, as in the usual arrangement of expansion-gearing.

Further objects are to provide novel and efficient means whereby two or more vertically-adjustable rollers may be geared together and driven from gears either carried by another pair of rollers journaled in stationary boxes or mounted upon spindles which are journaled in fixed bearings, and also to provide certain novel and improved details of construction.

To the attainment of these and other useful ends my said invention consists in matters hereinafter described, and particularly pointed out in the claims.

In carrying out the principles of my invention, a gear mounted upon a stationary support and an oppositely-arranged gear carried by an adjustable support are connected together by a tilting rotary shaft or axle having its ends jointed to said gears substantially in the manner hereinafter set forth, the adjustable support being also provided with one, or, if desired, with a couple of gears driven from the gear that is driven from the tilting rotary shaft and mounted upon the adjustable support, whereby when said adjustable support thus equipped with gearing driven from a gear at the opposite end of the tilting shaft is raised or lowered or shifted in any direction in a plane parallel with the plane that is occupied by the opposite gear the shaft or axle shall be free to tilt or to assume such angle to the plane of either gear as the adjustment of one of said gears may require, and at the same time the gears at opposite ends of the shaft will be connected together by the shaft or axle in a manner that will permit the rotation of gearing at one end of the tilting rotary shaft or axle to rotate the said shaft or axle, and, consequently, to drive the gearing at the opposite end of the tilting shaft or axle, and at the same time permit the gears thus disposed at opposite ends of the shafts to stand at all times in parallel planes, although the aforesaid adjustable support may be shifted so as to give a considerable end tilt to the shaft. This feature and also certain improved details are illustrated in the annexed drawings, which show my improvement applied to a set of feed-rolls, which may be employed with advantage in a planing or other wood-working machine.

Figure 4:
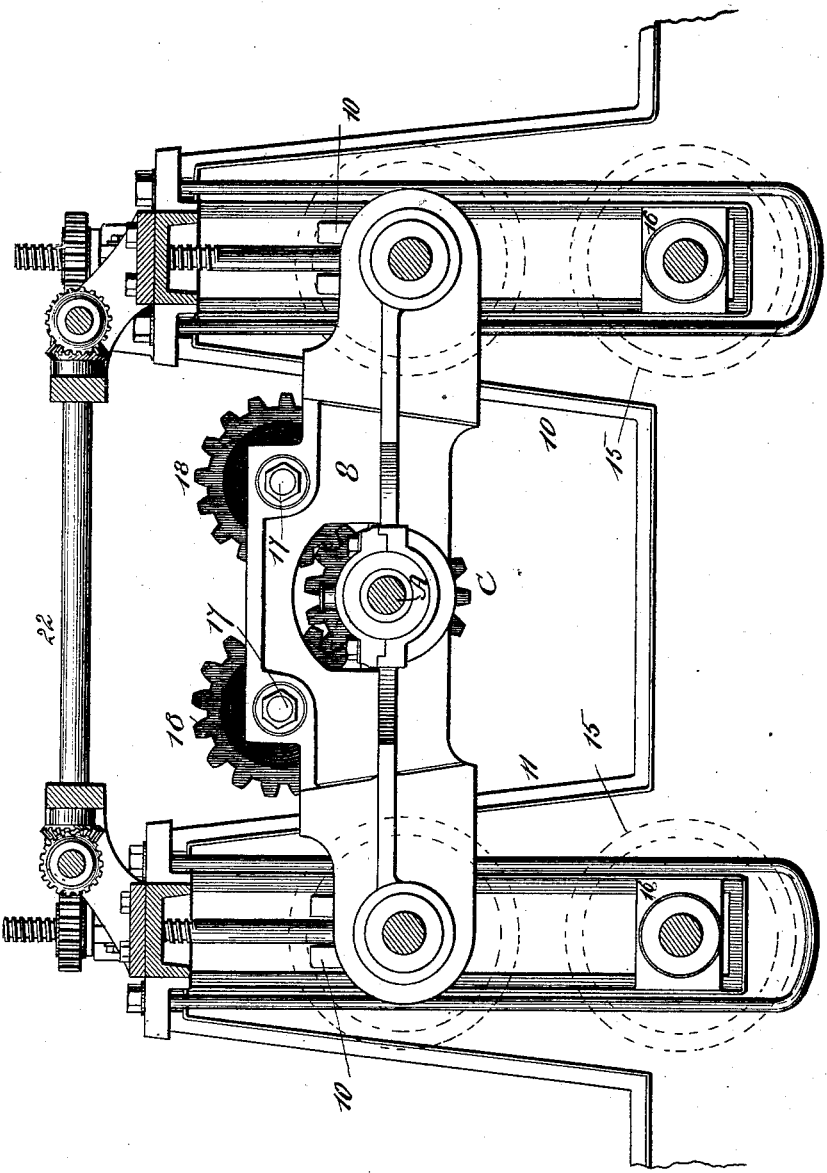

In said drawings, Figure 1 is a top plan view of certain feed-rolls and their supports and with my improvement applied thereto, portions of the devices in said figure being broken away and others shown in section. Fig. 2 represents a sectional elevation taken on the line *x x*, Fig. 1. Fig. 3 is a sectional detail taken through the two gears that are connected together by the rotary tilting axle, which latter is shown in elevation. This view represents one of the gears adjusted to a position somewhat higher than the other and with the axle in an inclined or tilted condition. Fig. 4 is a sectional view.

Referring by letter to the several figures of the drawings, in which like letters denote like parts, A indicates the rotary tilting shaft that is employed to connect together a pair of oppositely-arranged cogs or gear-wheels. In the present illustration B denotes the gear which is supported by a stationary bearing, and C indicates the gear which is supported by an adjustable bearing. The gears B and C are shown constructed and mounted alike, as follows: Each gear is recessed centrally from one side, so as to provide a chamber or recess somewhat larger than the diameter of the tilting shaft or axle, and at its opposite side said gear is provided with a hollow hub, 1, the bore of which opens into the aforesaid centrally-arranged recess. The tilting shaft or axle passes through the bores of these hubs and enters the enlarged recesses within the gears, at which points the axle is jointed to the gears in a manner to permit one gear to be shifted or adjusted in any direction in a plane parallel with the plane occupied by the oppositely-arranged gear, the axle or shaft under such circumstances being tilted proportionally to the adjustment of the gear, but still maintaining its connection with both gears, so that a rotation on the part of one gear will rotate the axle, which will in turn serve to drive the other gear.

The connection between the tilting shaft and each one of the gears is attained as follows: In the centrally-arranged recess of the gear is fitted a cylindric cap, D, preferably made of steel, and having its cylindric body portion provided with longitudinal grooves or slots 2. The end of the axle or shaft which terminates within this cap is provided with a set of radial lugs or teeth, 3, corresponding in number to the number of said slots, and arranged to enter the same. The caps D are rigid with the gears, being secured thereto in any suitable way—as, for example, by means of the bolts or screws 4—and hence the gears are, in effect, at all times engaged by the shaft by a connection which will permit the shaft to tilt when one of the gears is raised or lowered. The lugs or teeth 3 have their ends rounded, as in Figs. 2 and 3, so that when said shaft is tilted the lugs or teeth thereon may readily rock upon the bearing-surfaces which are provided within the gears. These teeth or lugs 3 are desirably arranged to radiate from hubs or enlargements 5, that are either formed with or secured to the rotary tilting shaft.

In order that a sufficient latitude of tilting movement may be allowed the shaft A, the bores of the hubs 1 expand in diameter from their inner to their outer ends, as indicated at 6. The hubs 1 of these two gears are herein shown as journaled in suitable boxes, E, one of which is secured to a stationary support, 7, while the other is secured to a vertically-sliding support, 8. The stationary support 7 may be and, as herein shown, is merely a horizontal plate or bar rigid with and arranged between a pair of standards, 9, presumably rising from the main frame of a planing-machine, and affording at this side of the same vertical guideways for the feed-roll boxes.

The support 8 consists of a plate arranged at the opposite side of the machine and connected with boxes 10, which are adjustable vertically in guideways of standards 11, and which at this side of the machine support the journals of the upper feed-rolls, 12, the vertically-adjustable boxes for the journals at the opposite end of said feed-rolls being fitted to work in standards 9, although said boxes are not herein shown.

The gear B is shown in mesh with gears 13 and 14, respectively carried by the journals or axles of the lower feed-roll, 15, the boxes for said lower feed-rolls being held stationary, as in Fig. 4, wherein two of said boxes 16 are shown. The tilting shaft occupies a position intermediate of the two feed-rolls 12, and hence occupies the same position relatively to the feed-rolls 15.

The vertically-adjustable support or plate 8 is provided with studs or short axles 17 for the two gears 18, which are at all times engaged by the gear C. These gears 18 engage and drive the gears 19, which at this side of the machine are carried by the upper feed-rolls, 12, as illustrated in Fig. 1. By such arrangement the respective axes of the upper feed-rolls, 12, and the gears 18, 19, and C maintain at all times the same position relatively to each other, since, when the upper feed-rolls are raised or lowered, the plate 8 will be raised or lowered with the same, while the gear C will, by reason of the tilting shaft A, be driven continuously from the non-adjustable gear B.

The devices shown for raising and lowering the upper feed-rolls need not be particularly described, but may be briefly said to consist of rotary shafts 20, geared to adjusting-screws 21, for raising and lowering the boxes of the upper feed-rolls, and a rotary shaft, 22, which is geared to the shafts 20, whereby a rotation on the part of one of these shafts 20 will effect a simultaneous rotation of the other corresponding shaft.

What I claim as my invention is—

1. The gear B and the gear C, connected together by a rotary tilting shaft or axle substantially in the manner described, in combination with the adjustable support 8, carrying both the gear C and a gear which is driven from said gear, the said support being adjustable in a direction to maintain the gearing thereon in a plane parallel with the plane occupied by the gear at the opposite end of the tilting rotary shaft or axle, substantially as and for the purpose described.

2. The gears B and C, connected together by the rotary tilting shaft A substantially in the manner described, in combination with a feed-roll, gear connected with the gear B, and a feed-roll connected with the gear C through the medium of a gear, 18, said gears C and 18 being carried by the vertically-adjustable support 8, substantially as described.

3. The combination, with the oppositely-disposed and centrally-recessed gear-wheels B and C, of the longitudinally-slotted caps D, fitted in the central recesses of the gear-wheels, and the tilting rotary shaft having its ends received within said caps and provided with radially-disposed teeth which engage in the slots of the caps, substantially as and for the purpose described.

LUCIUS P. HOYT.

Witnesses:
L. B. REYNOLDS,
C. C. HACKNEY.